US006535842B1

(12) United States Patent
Roche et al.

(10) Patent No.: US 6,535,842 B1
(45) Date of Patent: Mar. 18, 2003

(54) AUTOMATIC BILINGUAL TRANSLATION MEMORY SYSTEM

(75) Inventors: Emmanuel Roche, Boston, MA (US); Yves Schabes, Boston, MA (US)

(73) Assignee: Global Information Research and Technologies, LLC, Boston, MA (US)

( * ) Notice: Subject to any disclaimer, the term of this patent is extended or adjusted under 35 U.S.C. 154(b) by 0 days.

(21) Appl. No.: 09/457,801

(22) Filed: Dec. 9, 1999

Related U.S. Application Data
(60) Provisional application No. 60/111,702, filed on Dec. 10, 1998.

(51) Int. Cl.[7] .............................................. G06F 17/28
(52) U.S. Cl. .............................................. 704/7; 704/5
(58) Field of Search .............................. 704/2, 3, 4, 5, 704/6, 7, 277, 536; 707/536

(56) References Cited

U.S. PATENT DOCUMENTS

| | | | | |
|---|---|---|---|---|
| 5,535,120 A | * | 7/1996 | Chong et al. .................. | 704/2 |
| 5,548,508 A | * | 8/1996 | Nagami ......................... | 704/5 |
| 5,587,902 A | * | 12/1996 | Kugimiya ...................... | 704/5 |
| 5,659,765 A | * | 8/1997 | Nii ................................ | 704/2 |
| 5,724,593 A | * | 3/1998 | Hargrave, III et al. ......... | 704/3 |
| 5,826,219 A | * | 10/1998 | Kutsumi ........................ | 704/4 |
| 5,842,159 A | * | 11/1998 | Nakamura et al. ............. | 704/4 |
| 5,848,386 A | * | 12/1998 | Motoyama ..................... | 704/5 |
| 5,867,811 A | * | 2/1999 | O'Donoghue .................. | 704/1 |
| 6,139,201 A | * | 10/2000 | Carbonell et al. .............. | 704/2 |
| 6,119,077 A | * | 12/2000 | Shinozaki ...................... | 704/3 |

OTHER PUBLICATIONS

Harris, B., "Bi–text, a new concept in translation theory", *Language Monthly*, XP–000747663, 8–11, 1988.
"Interlinear Bitext", *Language Technology*, XP 000747836, 9108, 12–13, 1988.
"Translation Method By Sentence Examples", *IBM Technical Disclosure Bulletin*, XP 000049761, 31, 438–439, Oct. 1988.
"Translation–Example Retrieving Method", *IBM Technical Disclosure Bulletin*, XP 000023398, 31, 59–61, Aug. 31, 1988.

* cited by examiner

Primary Examiner—Patrick N. Edouard
(74) Attorney, Agent, or Firm—Choate, Hall & Stewart

(57) ABSTRACT

A system builds a text fragment database for use in translating fragments of text from a source language into a target language. The system first stores a sentence database in memory, the sentence database comprising a plurality of sentence pairs, each sentence pair including a sentence in the source language and a corresponding sentence in the target language. The system then locates corresponding source and target text fragments in corresponding source and target language sentences, respectively, and stores the source text fragment together with the target text fragment in the text fragment database. The text fragment database can then be used to translate text from the source language into the target language. To this end, the system inputs text in the source language, extracts a text fragment from the input text, and locates the extracted text fragment in the text fragment database. The system then retrieves, from the text fragment database, a text fragment in the target language that corresponds to the extracted text fragment, and outputs the retrieved text fragment.

39 Claims, 5 Drawing Sheets

AUTOMATIC BILINGUAL TRANSLATION MEMORY SYSTEM

This application claims the benefit of Provisional Application No. 60/111,702, filed Dec. 10, 1998.

BACKGROUND OF THE INVENTION

1. Field of the Invention

The present invention is directed to a system for translating text from a source language, such as English, into a target language, such as French. In operation, the invention creates a database comprised of text fragments in the source language, together with their counterparts in the target language. When presented with untranslated text in the source language, the invention locates the untranslated text in the database, and then retrieves, from the database, corresponding text fragments in the target language. The invention has particular utility in connection with interactive text translation systems; although the invention can be implemented in automatic text translation systems as well.

2. Description of the Related Art

With the globalization of the economy, there has come an increased need for systems which translate text from one language into another language. Currently, there are two different types of translation systems available on the market—interactive systems and automatic systems. Automatic translation systems input text from a first language and translate that text to a second language without any significant user interaction. Such systems are extremely difficult to implement due to differences in language grammar and vocabulary, and are often prone to errors.

More common are the interactive systems. In these systems, a human translator (hereinafter "the translator") queries a language database for translations of untranslated text. An example of such a system is the Trados™ Translator Workbench. One problem with conventional systems of this type is that they are limited to use with sentences. That is, differences in sentence structures between various languages have caused developers of conventional systems to design databases based on sentence structures. As a result, these systems allow a translator to search for a translation of an entire sentence, but not portions thereof. This is a significant shortcoming of the conventional systems, since it effectively limits their use to sentences which have counterparts in the database, of which, not surprisingly, there are few.

Accordingly, there exists a need for a text translation system which is able to translate text fragments comprised, e.g., of less than an entire sentence, from one language into another language.

SUMMARY OF THE INVENTION

The present invention addresses the foregoing needs by providing a system (e.g., a method, an apparatus, and computer-executable process steps) which builds a database comprised of text fragments in a source language and translations of those text fragments into a target language. This database can then be queried to provide for translations of sentence fragments from the source to the target language. By providing the ability to translate sentence fragments, the invention provides a significant advantage over the prior art. That is, since there is a greater likelihood of sentence fragments being stored in the database, than there is of entire sentences, more text can be translated by the present invention than by the conventional systems described above.

According to one aspect, the present invention is a system that builds a text fragment database for use in translating fragments of text from a source language into a target language. The system first stores a sentence database in memory, the sentence database comprising a plurality of sentence pairs, each sentence pair including a sentence in the source language and a corresponding sentence in the target language. The system then locates corresponding source and target text fragments in corresponding source and target language sentences, respectively, and stores the source text fragment together with the target text fragment in the text fragment database. The text fragment database can then be used to translate text from the source language into the target language. To this end, the system inputs text in the source language, extracts a text fragment from the input text, and locates the extracted text fragment in the text fragment database. The system then retrieves, from the text fragment database, a text fragment in the target language that corresponds to the extracted text fragment, and outputs the retrieved text fragment.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Initially, it is noted that the present invention can be implemented on a variety of different types of computing equipment, including stand-alone personal computers ("PCs"), networked computers, laptop computers, "dumb terminal" workstations, or the like. For the sake of brevity, however, the invention will be described in the context of a stand-alone PC only.

Figure 1:
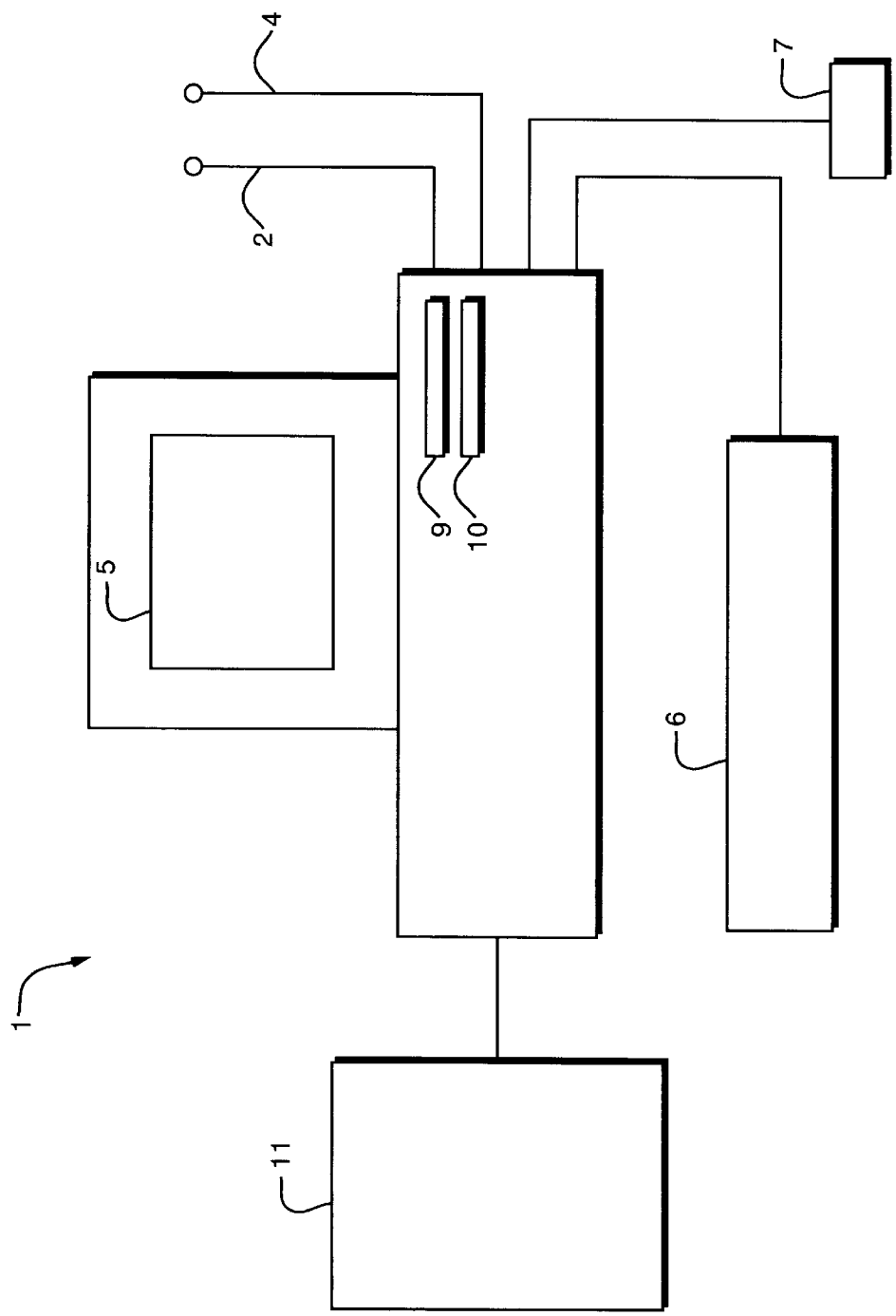
FIG. 1 is an overview of a computer system on which the present invention may be implemented.

In this regard, FIG. 1 shows computing equipment for a PC 1 on which the invention may be implemented. As shown in FIG. 1, PC 1 includes network connection 2 for interfacing to a network and fax/modem connection 4 for interfacing to the network or other devices (not shown). These features may be of use in building and/or accessing a database, such as those described below, remotely. PC 1 also includes display screen 5 for displaying information, including input and translated text, to a user, keyboard 6 for inputting text and user commands, mouse 7 for positioning a cursor on display screen 5 and for inputting user commands, disk drive 9 for reading from and writing to floppy disks installed therein, and CD-ROM drive 10 for accessing data (e.g., a dictionary database) stored on CD-ROM. PC 1 may also have one or more local peripheral devices connected thereto, such as printer 11.

Figure 2:
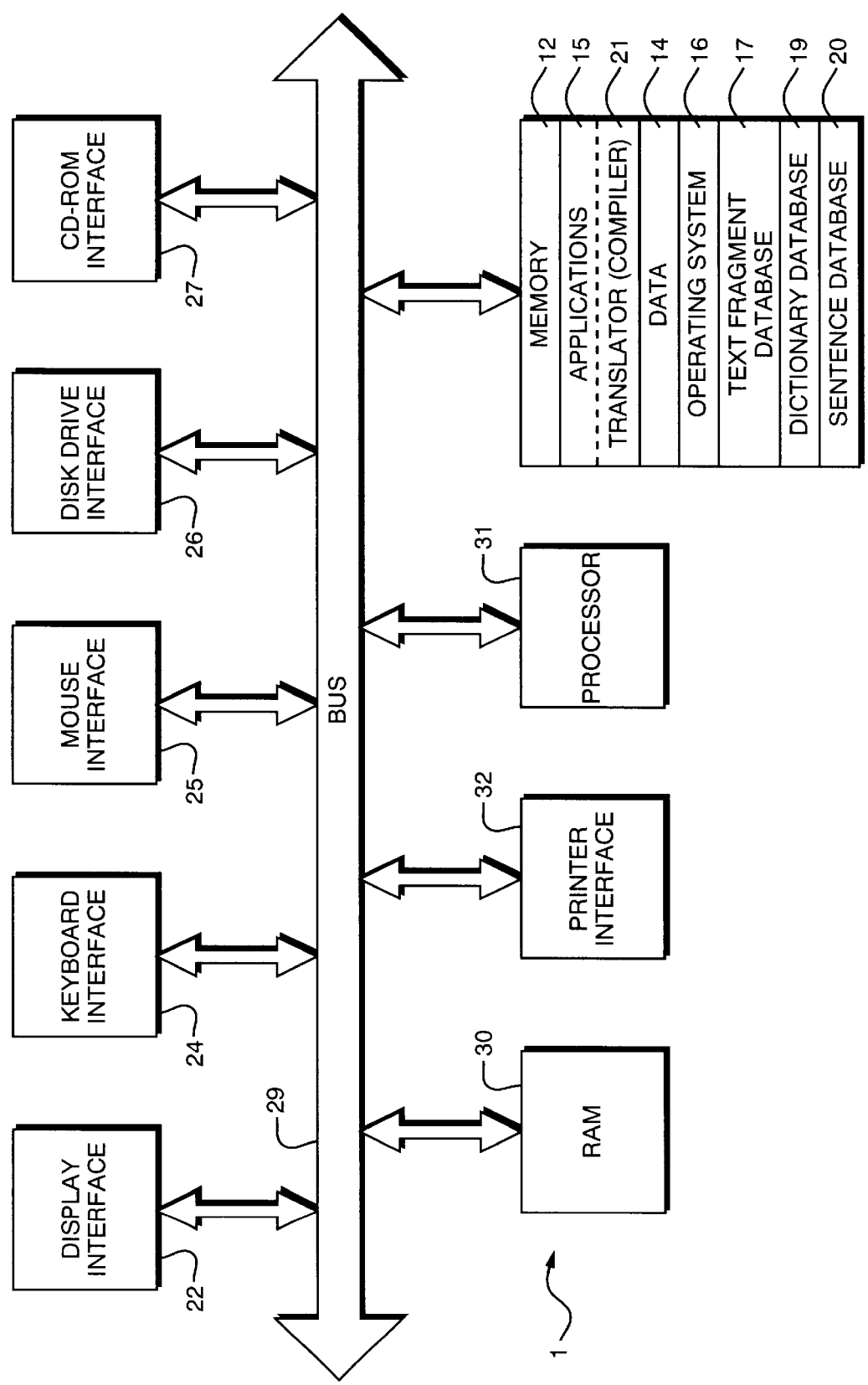
FIG. 2 shows the architecture of the computer system.

FIG. 2 shows the internal structure of PC 1. As shown in FIG. 2, PC 1 includes memory 12, which comprises a computer-readable medium such as a computer hard disk and/or RAID ("redundant array of inexpensive disks"). Memory 12 stores data 14, applications 15, operating system 16, text fragment database 17, dictionary database 19, and sentence database 20. In preferred embodiments of the invention, operating system 16 is a windowing operating system, such as Microsoft® Windows98; although the invention may be used with other operating systems as well.

Among the applications stored in memory 12 is translator 21 of the present invention. Translator 21 may be an automatic translation system which translates input text without substantial user intervention. Preferably, however, translator is an interactive translation system, which works in conjunction with a human translator to translate text from a source language, such as English, into a target language, such as French. Dictionary database 19 stores individual words in the source language and their translations into the target language. Sentence database 20 stores a plurality of sentence pairs, each of which includes a sentence in the source language and a corresponding sentence in the target language. Text fragment database 17 stores source text fragments extracted from the source language sentences, together with corresponding target language text fragments extracted from the target language sentences. These two databases are described in greater detail below.

As shown in FIG. 2, PC 1 also includes display interface 22, keyboard interface 24, mouse interface 25, disk drive interface 26, CD-ROM drive interface 27, computer bus 29, RAM 30, processor 31, and printer interface 32. Processor 31 preferably comprises a microprocessor or the like for executing applications, such those noted above, out of RAM 30. Such applications, including translator 21, may be stored in memory 12 (as noted above) or, alternatively, on a floppy disk in disk drive 9 or a CD-ROM in CD-ROM drive 10. Similarly, the databases noted above (namely, sentence database 20, text fragment database 17, and dictionary database 19) may also be stored on a floppy disk in disk drive 9 or a CD-ROM in CD-ROM drive 10. Processor 31 accesses applications or databases stored on a floppy disk via disk drive interface 26 and accesses applications or databases stored on a CD-ROM via CD-ROM drive interface 27.

Application execution and other tasks of PC 1 may be initiated using keyboard 6 or mouse 7, commands from which are transmitted to processor 31 via keyboard interface 24 and mouse interface 25, respectively. Output results from applications running on PC 1 may be processed by display interface 22 and then displayed to a user on display 5 or, alternatively, output to a network via network connection 2. To this end, display interface 22 preferably comprises a display processor for forming images (e.g., text images) based on data provided by processor 31 over computer bus 29, and for outputting those images to display 5.

Turning to translator 21, in brief, this application comprises computer-executable code (i.e., process steps) which builds a text fragment database for use in translating fragments of text from a source language into a target language. Translator 21 locates corresponding source and target text fragments in corresponding source and target language sentences, respectively, in sentence database 20, and stores the source text fragment together with the target text fragment in text fragment database 17. Text fragment database 17 can then be used to translate text from the source language into the target language. To this end, translator 21 inputs text in the source language, extracts a text fragment from the input text, and locates the extracted text fragment in text fragment database 17. Translator 21 then retrieves, from text fragment database 17, a text fragment in the target language that corresponds to the extracted text fragment, and outputs the retrieved text fragment.

Figure 3A:
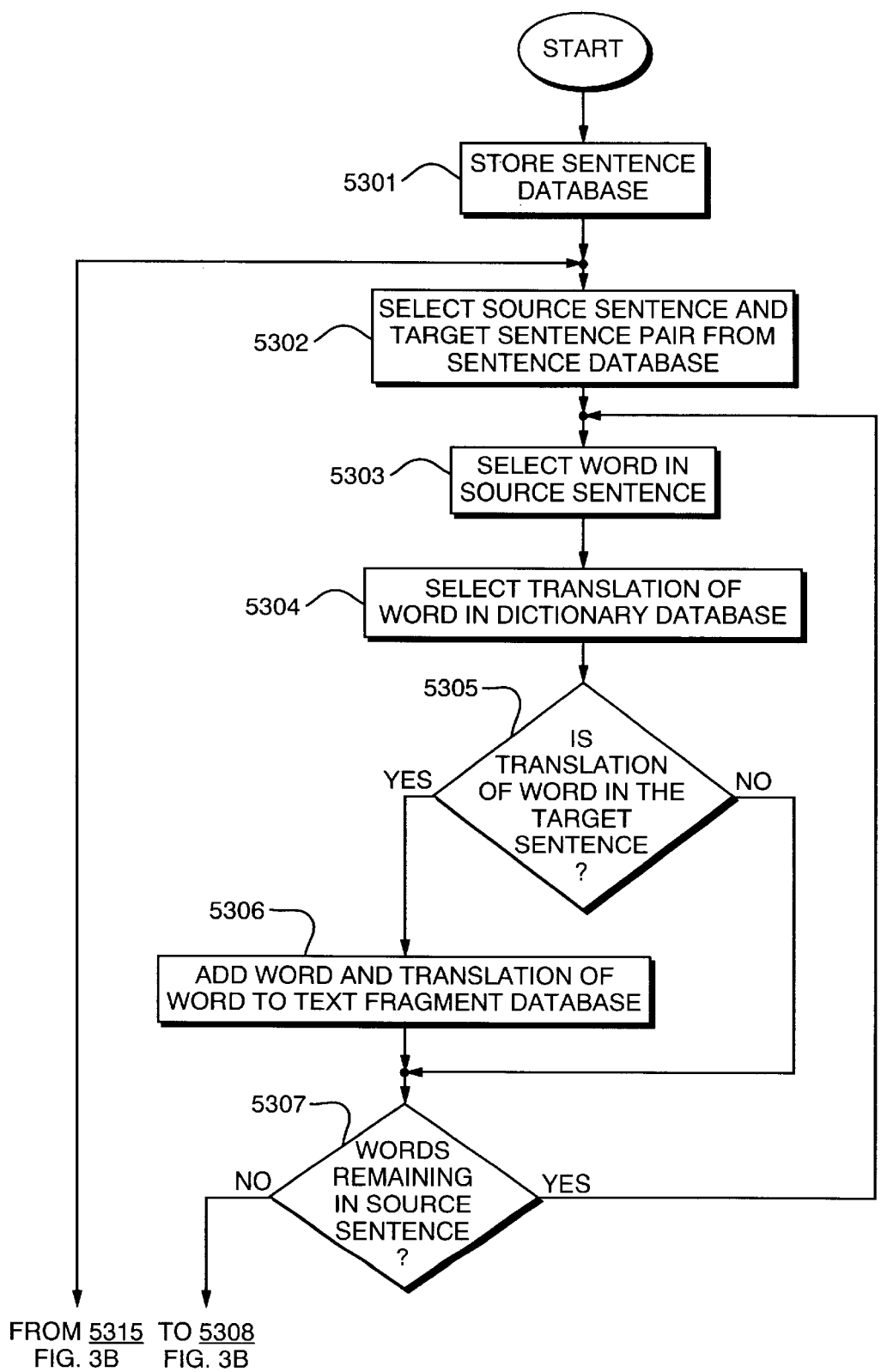
FIG. 3, comprised of FIGS. 3A and 3B, is a flow diagram showing process steps for generating a text fragment database in accordance with the present invention.
Figure 3B:
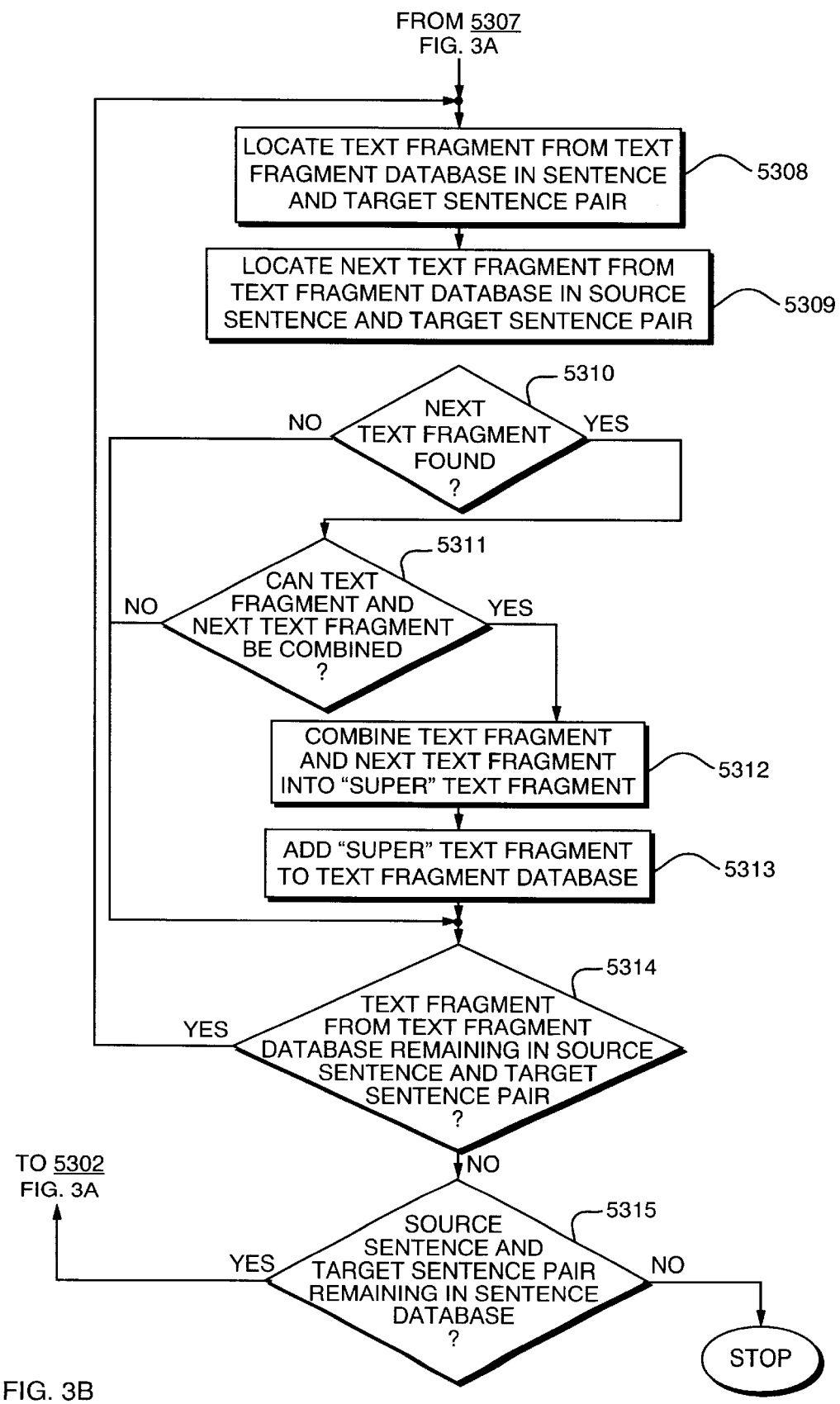
Figure 4:
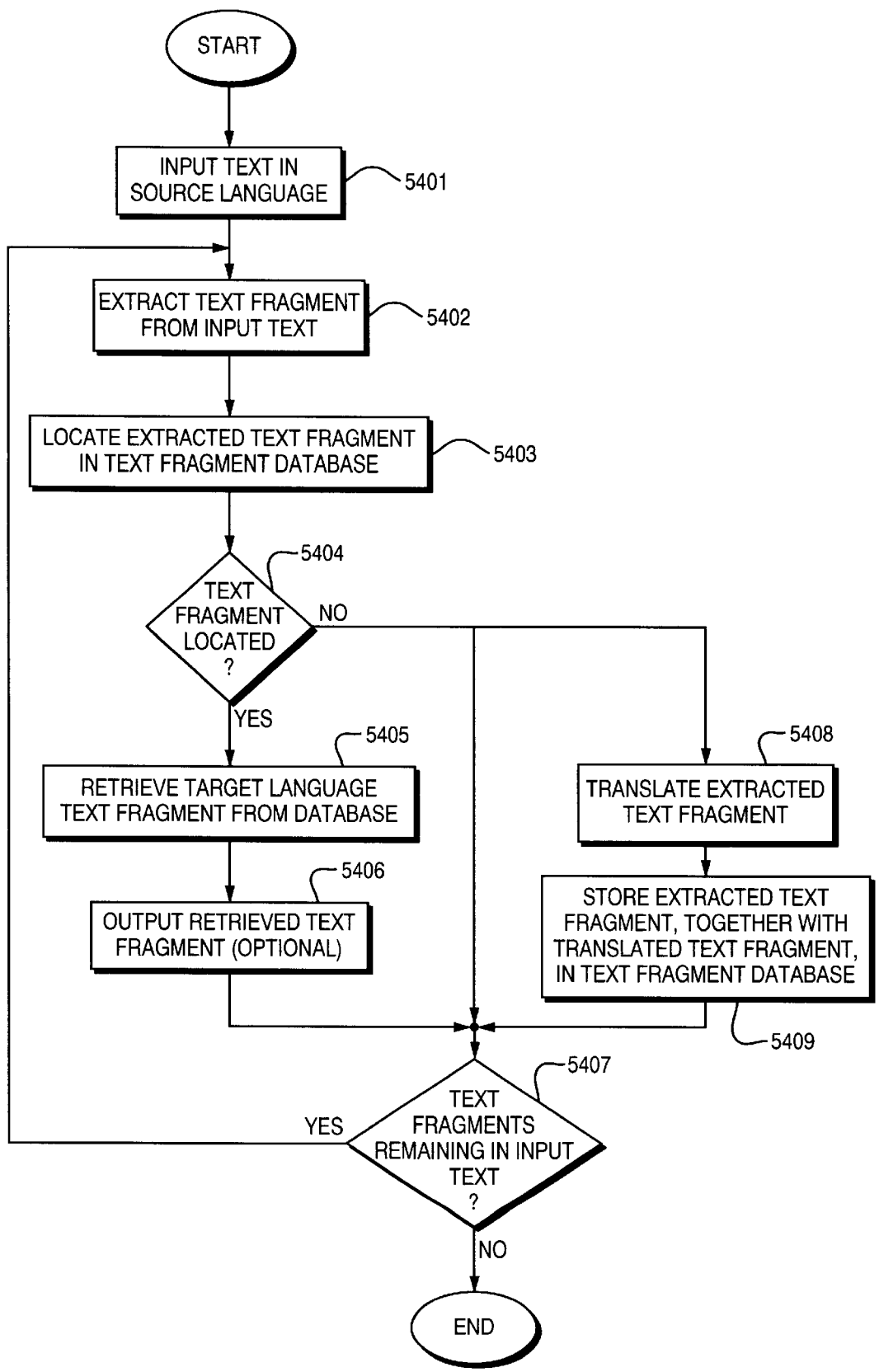
FIG. 4 is a flow diagram showing process steps for translating a text fragment using the text fragment database.

FIGS. 3 and 4 show the operation of translator 21 in more detail. Specifically, FIG. 3 shows process steps for building text fragment database 17 and FIG. 4 shows process steps for translating input text using text fragment database 17. FIG. 3 will be explained first.

To begin, step S301 stores sentence database 20 in a memory, such as memory 12. The sentence database may be of the type used in conventional translation systems, or it may be specially designed to include additional information, such as parts-of-speech of individual words in the sentence. In any case, sentence database 20 includes a plurality of sentence pairs. These sentence pairs comprise one sentence in the source language, together with, and referenced to (e.g., with pointers), that same sentence translated into the target language. In preferred embodiments of the invention, the sentence database is prepared "manually" beforehand, meaning that a human translator translates each sentence in the source language into its counterpart in the target language, and then enters both sentences in the database. Of course, the invention may use any automatic translation means currently available to prepare the sentence database. Once sentence database 20 has been prepared, processing proceeds to step S302.

In this regard, steps S302 to S315 comprise locating corresponding source and target text fragments in respective source and target language sentences in sentence database 20, and storing the source text fragments, together with the target text fragments, in text fragment database 17. In preferred embodiments of the invention, these process steps are implemented via a compiler, which is preferably a routine running within translator 21.

Thus, by way of example, if the system is used to translate between English and German, text fragment database 17 will be constructed from a set of sentence pairs consisting of English sentences and corresponding sentences translated into German and stored in sentence database 20. In this example English is the source language, and German is the target language. To begin building text fragment database 17, the system first selects a sentence in the source language and its corresponding translation in the target language. For example, referring to FIG. 3A, step S302 may select the following English language sentence from sentence database 20:

"The new house is small."

Sentence database 20 will include, in association with this English sentence, the German translation:

"Das neue Haus ist klein."

Having selected (from sentence database 20) a sentence in the source language and its corresponding translation in the target language, identification of source and target text fragments proceeds in two phases. In the first phase (shown in FIG. 3A), the system identifies individual words in the source text sentence, translates them using dictionary database 19, and attempts to find the corresponding translated word in the target sentence. If a corresponding translated word is found in the target sentence, then the source and target words are stored as associated text fragmenis in text fragment database 17, e.g., as a text fragment pair. Thus in this first phase, the system identifies all words in the source sentence that have corresponding words in the target sentence. In this regard it is noted that the term "word" as used herein, can refer to a simple word such as "computer" or "decided", a portion of a word, a compound word such as "potato chip", or even an expression such as "kick the bucket", depending upon the contents of dictionary database 19. For the sake of clarity, the operation of the system will be described with regard to a sentence consisting of simple words.

To explain the operation of the system with reference to the example above, after step S302 (see FIG. 3A) selects the source and target sentence pair, step S303 may then identify the fragment "The". Step S304 selects the German translation "Das" using dictionary database 19. Step S305 then compares the translated word "Das" in the target language (German) to the target language sentence and determines whether the translated word can be found in the target language sentence. If, as in this example, the translated word occurs in the target sentence, processing proceeds to step S306. Step S306 stores the source fragment ("The") and target fragment ("Das") in the text fragment database as a pair. Processing then proceeds to step S307. If step S305 fails to find a corresponding fragment in the target sentence, processing jumps directly from step S305 to step S307. This may occur if the source and target language sentences differ slightly, which is permitted in the invention. For example, the sentences may be very close in meaning but not identical, or the sentences may contain words (such as articles) that may be required in one language but not in another. In such cases a word in the source sentence may have no direct counterpart in the target sentence.

Returning to the example, step S307 determines whether any words remain in the source sentence. If so, processing returns to step S303, which selects another word from the source sentence and continues as described above. In a preferred embodiment of the invention, words are selected in the order in which they appear in the source sentence (e.g., from left to right in the case of languages that are written from left to right), though this is not a requirement. As long as step S307 determines that further words remain in the source sentence, steps S303, S304, S305, S306, and S307 are executed sequentially. As this process continues, pairs consisting of a word from the source sentence and a corresponding translation found in the target sentence are added to text fragment database 17. In general, each pair is of the form (source language word, target language word). Thus in the case of the example, the following five pairs will be stored in the text fragment database:

(The, Das); (new, neue); (house, Haus); (is, ist); (small, klein)

When step S307 determines that no further words remain in the source sentence, identification of text fragments from the source and target sentences proceeds to the second phase (FIG. 3B).

The overall goal of the second phase is to build text fragments of increasing length, beginning with the one-word text fragments stored in the text fragment database during the first phase described above. To this end, step S308 locates a first text fragment pair from the text fragment database, where the first text fragment pair consists of a text fragment found in the source sentence and a corresponding text fragment found in the target sentence, e.g., (first source language fragment, first target language fragment). Initially, while the system is still working with one-word fragments, such a pair is of the form (first source language word, first target language word). In the present example, step S308 may locate text fragment pair (The, Das). Step S309 then attempts to locate a next text fragment pair, e.g., (second source language fragment, second target language fragment) in the text fragment database. In a preferred embodiment of the invention the second source language fragment is adjacent to the first source language fragment. In the present example, step S309 may locate next text fragment pair (new, neue).

If step S309 successfully identifies a next text fragment pair in the text fragment database, processing proceeds through step S310 to step S311, which determines whether the first text fragment and the next text fragment can be combined in both source and target language sentences. In the present example, first source language fragment "The" and second source language fragment "new" can be combined into text fragment "The new". Step S311 examines the target language sentence and determines whether the corresponding target text fragments "Das" and "neue" can be combined. If, as in this example, the target text fragments appear in the target language sentence in the same order as in the source language sentence, step S311 determines that they can be combined. As described below, step S31 can use a variety of criteria to determine whether a first text fragment and a next text fragment can be combined.

If, as in this example, step S311 determines that the first text fragment and the next text fragment can be combined in both source and target languages the processing proceeds to step S312, which combines first source text fragment and next source text fragment into a "super" source text fragment and also combines first target text fragment and next target text fragment into a "super" target text fragment. Thus in the present example, step S311 produces the text fragment pair (The new, Das neue). Step S313 then adds the "super" text fragment pair to the text fragment database, and processing proceeds to step S314. In the case that step S311 determines that first and next text fragments cannot be combined, processing goes directly to step S314, bypassing the steps of combining and generating "super" text fragments.

Step S314 determines whether there are any text fragment pairs from the source and target sentence pair remaining in the text fragment database. Such pairs could be either pairs of words generated in the first phase described earlier (steps S303 to S307), or new "super" text fragments added to the text fragment database in the second phase (steps S308 to S313). In the case that there are remaining text fragment pairs, processing returns to step S308 and continues as described above. In the present example, the system is able to extend the initial text fragment pair (The, Das) by generating text fragment pairs (The new, Das neue), (The new house, Das neue Haus), (The new house is, Das neue Haus ist), and (The new house is small, Das neue Haus ist klein). Each of these text fragment pairs is added to the text fragment database. Of course in this example the system generates a number of other text fragment pairs as well. For instance, beginning with the text fragment pair (new, neue) the system would generate text fragment pairs (new house, neue Haus) and (new house is, neue Haus ist), etc. and add them to the text fragment database. In certain embodiments of the invention, in order to generate an exhaustive set including all cases, a technique such as dynamic programming is employed.

As long as step S314 determines that there are remaining text fragment pairs from the source and target sentences remaining in the text fragment database, processing proceeds sequentially through steps S308 to S314. When step S314 determines that no text fragments remain, processing proceeds to step S315, which determines whether any source and target sentence pairs remain in the sentence database. If so, processing returns to step S302, which selects the next source and target sentence pair for processing. This sequence continues until text fragments have been extracted from all sentence pairs in the sentence database.

The operation of the system for building a text fragment database, as described above, has assumed that the first phase of text fragment identification (dictionary translation of words) has proceeded by looking up words from the source language sentence and obtaining translations in the target language sentence. However, it is noted that the process could also be carried out by looking up words from the target language sentence and obtaining translations in the source language from the dictionary database. Similarly, the second phase of text fragment identification, i.e., combining text fragments into larger text fragments, can proceed in either order with respect to the source and target languages. Thus both phases of the construction of the text fragment database from source and target language sentence pairs can proceed in either or both orders with respect to the source and target languages.

Certain aspects of the operation of the process steps for building the text fragment database may be better appreciated by consideration of a more complex example consisting of the following source and target sentence pair:

"The chairman of the board decided to allow the proposed merger."

"Le president du conseil d'administration a decidé de permettre la fusion proposée."

As mentioned above, dictionary database 19 may contain not only simple words but also compound words or phrases such as "potato chip". With regard to the above example, dictionary database 19 may contain the French translation "conseil d'administration" for the English word "board". In this case, step S304 selects the phrase "conseil d'administration" as a translation for the word "board", and step S305 determines that "conseil d'administration" is found in the target language sentence. Step S306 then adds the pair (board, conseil d'administration) to the text fragment database. Thus in building the text fragment database, process steps S303 to S307 will extract text fragment pairs including:

(The chairman, Le president)

(The chairman of the board, Le president du conseil d'administration)

(The chairman of the board decided, Le president du conseil d'administration a decidé)

Of course a number of other text fragment pairs will be added to the text fragment database as well.

In certain embodiments of the invention the determination of whether a first text fragment and a next text fragment can be combined into a "super" text fragment is made by considering whether the first text fragment and the next text fragment appear consecutively in the sentence (i.e., whether the next text fragment immediately follows the first text fragment). However, a number of other criteria may be used to determine whether text fragments can be combined. In a preferred embodiment of the invention, the next text fragment need not appear immediately after the first text fragment but may instead precede the first text fragment, i.e., the text fragments are adjacent but may appear in either order. Due to differences in language syntax, (e.g., adjective-noun for languages such as English and German and noun-adjective for Romance languages), text fragments on both sides of the original target text fragment are preferably compared to the translated source text fragments, in a process referred to as "crossing". For example, the English phrase "red book" is translated into the French "livre rouge". When considering whether the text fragment pairs (red, rouge) and (book, livre) can be combined into a "super" text fragment pair, the use of crossing permits such combination even though "book" follows "red" in the English phrase whereas "livre" precedes "rouge" in the French phrase. With reference to the sentence pair presented above, the use of crossing allows the system to recognize that text fragment pairs (proposed, proposée) and (merger, fusion) can be combined into "super" text fragment pair (proposed merger, fusion proposée).

When building the text fragment database, the invention may also include additional information in that database and/or store data in that database in particular ways based, e.g., upon the syntax of the source and/or target languages. For example, the invention may include steps for determining grammatical information for each text fragment, such as that fragment's part-of-speech, and for storing this grammatical information in text fragment database 17, together with the corresponding source and/or target text fragments. In preferred embodiments of the invention, the grammatical information is determined by a part-of-speech disambiguator, such as that described in U.S. patent application Ser. No. 09/084,535, filed on May 26, 1998, the contents of which are hereby incorporated by reference into the subject application as if set forth herein in full. Of course, other well-known methods may also be used to determine the grammatical information.

Similarly, steps S306 and S313 may store root forms of words instead of, or in addition to, the grammatical information described above. In particular, these root forms may be determined using well known means, such as by reference to dictionary database 19 or the like, and then stored with either or both of the source text fragments and their corresponding target text fragment counterparts. Both the root form and the grammatical information noted above may be used in connection with performing translations using the text fragment database, as described in more detail below.

In addition to the foregoing, storing steps S306 and S313 and/or combining step S312 may be sensitive to the grammatical syntax of a language. For example, the English sequence of "adjective-noun" could be modified in the storing steps to correspond to the French sequence of "noun-adjective". In certain embodiments of the invention additional syntactical variations are incorporated into the system, depending upon the languages in question. Thus the system can incorporate syntactic patterns that allow for combination of text fragments in the source and target languages that may not be consecutive or adjacent, thus extending the capabilities beyond the "crossing" mentioned above. Syntactic and/or grammatical information can also be employed in conjunction with "crossing" to minimize generation of inappropriate text fragments.

The following example serves to illustrate the foregoing aspects of the invention. The English sentence "He runs fast."

can be translated into French as:

"Il court de manière rapide."

The translation of the English verb "runs" into the French verb "court" would be found in a dictionary database such as dictionary database 19. Similarly, the translation of the English adverb "fast" into the French adjective "rapide" would appear in the dictionary. (Note that "fast" functions as an adverb since it modifies the verb "runs", whereas "rapide" functions as an adjective since it modifies the noun "manière"). However, in the English sentence there is no occurrence of a possible translation of the French words "de manière" (as there would be in the English sentence "He runs in a rapid manner."). Without the use of syntactic patterns, the system would therefore not be able to produce the text fragment pair (runs fast, court de manière rapide)

In order to handle such cases, in certain embodiments of the invention the system uses predefined syntactic patterns to combine smaller text fragments into larger text fragments.

For example, the following English-French syntactic pattern (with English on the left):

VERB ADVERB< - - - >VERB de manière ADJECTIVE will allow the system to produce the text fragment pair (runs fast, court de manière rapide) by combining the text fragment pairs (runs, court) and (fast, rapide). The system makes use of the syntactic pattern by recognizing that "runs" is a verb and "fast" is an adverb, thus matching the pattern "VERB ADVERB". In addition, "court" is a verb and "rapide" is an adjective, and their occurrence in the text matches the pattern "VERB de manière ADJECTIVE". Note that in this example the words "court" and "rapide" are not contiguous nor even adjacent but can be combined through the use of the syntactic pattern "VERB de manière ADJECTIVE".

A second example of an English-French syntactic pattern (with English on the left) is:

NOUN 1 NOUN 2< - - - >NOUN 2 de ARTICLE NOUN 1

This syntactic pattern is used to produce the following text fragment pair:

(employment cost, coût de l'emploie)

from text fragment pairs (employment, emploie) and (cost, coût) produced following translation of English text fragments "employment" and "cost" by the dictionary database. In this example, the English text fragments "employment" and "cost" match the syntactic pattern "NOUN 1 NOUN 2", where "employment" corresponds to NOUN 1, and "cost" corresponds to NOUN 2. The French word "l'" is an article, and text fragment "coût de l'emploie" matches the syntactic pattern "NOUN 2 de ARTICLE NOUN 1", where "emploie" corresponds to NOUN 1 and "coût" corresponds to NOUN 2. Thus although English fragments "employment" and "cost" appear consecutively whereas French fragments "coût" and "emploie" are separated by two words and also appear in the opposite order, through the recognition of the syntactic pattern presented above, the text fragment pairs (employment, emploie) and (cost, coût) can be appropriately combined to form a "super" text fragment pair that can be added to the text fragment database.

Turning now to the translation of input text, FIG. 4 shows process steps of translator 21 (executed, e.g., in the compiler) which use text fragment database 17 to translate text in the source language to text in the target language. To begin, step S401 inputs text in the source language. This input text may be a sentence, a string of words, or a portion of a word, and may be input, e.g., via keyboard 6, mouse 7, or the like. An example of input text which illustrates operation of the invention is "The proposed merger went without any problem."

Next, step S402 extracts a text fragment from the input source language text for translation into the target language. For the purposes of the present invention, this text fragment may comprise a single word, a portion of a word, several words, the entire sentence, etc. Step S403 then attempts to locate the extracted text fragment in text fragment database 17. In particular, step S403 compares the extracted text fragment to source text fragments in database 17. In a case that step S403 is able to locate a corresponding source text fragment, processing proceeds through step S404 to step S405. In step S405, the target text fragment corresponding to the source text fragment is retrieved, whereafter processing proceeds to step S406 in which the target text fragment is optionally output via display 5, e.g., to a user such as a human translator using the system.

It is noted that output of the target text fragment is optional, i.e., not all target text fragments may be presented to the user. For example, in certain embodiments of the invention short text fragments (e.g., single words) are not output. In certain preferred embodiments the decision regarding whether a particular text fragment is output may be made based on a variety of criteria, e.g., length of the target text fragment. For example, the system may output only the longest target text fragment identified, e.g., in the case that the longest target text fragment is a complete sentence. In preferred embodiments of the invention the system may present the longest translatable fragments first. In a preferred embodiment the system may output a set of overlapping target text fragments. Thus the results of the translation steps may be presented to a user in a variety of ways.

With reference to the example above, step S402 may extract the source text fragment "The proposed merger". Step S403 will then attempt to locate this extracted text fragment in text fragment database 17. As described above, database 17 will include such a fragment (and its corresponding target language translation), since that fragment was part of the sentence pair "The chairman of the board decided to allow the proposed merger.", and "Le president du conseil d'administration a decidé de permettre la fuision proposée."

Accordingly, step S403 will locate the "The proposed merger" in text fragment database 17; step S405 will retrieve its corresponding translation "la fusion proposée" therefrom; and, in certain embodiments of the invention, step S406 will output that translation.

Following step S406, in which the system optionally outputs the translated text fragment, processing proceeds to step S407, which determines whether there are any fragments remaining in the input text. If there are fragments remaining, processing returns to step S402, wherein a next fragment is extracted and the foregoing is repeated. On the other hand, if there are no fragments remaining in the input text, processing of that text ends.

Returning to step S403, in a case that step S403 was unable to locate the extracted text fragment in text fragment database 17, in certain embodiments of the invention processing proceeds through step S404 to step S408. In step S408, a translator translates the extracted text fragment. As noted above, in certain preferred embodiments of the invention, the present invention is interactive. Accordingly, in step S408, the translator is preferably a human translator. For example, the invention may output a message indicating that the extracted text fragment could not be found in database 17, and indicating that "manual" translation thereof is required. In response, the human translator may perform the necessary translation. Of course, in cases where an automated translator, such as a translation program, is used, this process is performed automatically without significant user intervention.

Following step S408, processing proceeds to step S409. In step S409, both the extracted text fragment (in the source language) and the translated text fragment (in the target language) are stored in text fragment database 17. This storage may be automatic, again meaning without significant user intervention, or in response to an input user command. In any case, storing these additional text fragments in text fragment database 17 increases the utility of the database, since it increases the number of text fragments that can be used for translation. It is noted that the use of either a human translator or an automatic translator is optional, and may be employed to allow the text fragment database to grow with increasing use of the system. The system may be configured so that it can operate either with or without including steps S408 and S409.

Following step S409 (or following step S404 in the case that steps S408 and S409 are not included in the translation process steps), processing proceeds to step S407, which determines whether there are any fragments remaining in the input text. As above, if there are fragments remaining, processing returns to step S402, wherein a next fragment is extracted and the foregoing is repeated. On the other hand, if there are no fragments remaining in the input text, processing of the input text ends.

Of course, the invention may include variations on the processing shown in FIG. 4. For example, in cases where text fragment database 17 also stores grammatical and/or syntactic data corresponding to the text fragments in the source language and/or to the text fragments in the target language, between step S402 and step S403 the invention may include a step for determining grammatical data (e.g., part-of-speech, such as noun, verb, etc.) associated with the extracted text fragment. In this case, step S403 may search through the database only for text fragments in the source language that have grammatical data corresponding to the grammatical data associated with the extracted text fragment. All other text fragments will be ignored. This feature of the invention reduces searching errors and also reduces the amount of time required to perform the search.

Similarly, in cases where text fragment database 17 stores roots of translated and untranslated text fragments, the invention may also be used to retrieve roots of translated words, or to retrieve translations based on word roots. The process for retrieving roots is similar to that described above. Accordingly, it will not be repeated here for the sake of brevity.

At this point, it is noted that the invention is not limited to the embodiment described above. For example, the text fragment database may include translations into several target languages of text from one or more source languages. In this regard; the present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

What is claimed is:

1. A method of building a text fragment database for use in translating fragments of text from a source language into a target language, the method comprising the steps of:
    a first storing step for storing a sentence database in memory, the sentence database comprising a plurality of sentence pairs, each sentence pair including a sentence in the source language and a corresponding sentence in the target language;
    automatically locating corresponding source and target text fragments in corresponding source and target language sentences, respectively, without requiring that the source text fragment or the target text fragment have been previously stored in the text fragment database; and
    a second storing step for storing the source text fragment together with the target text fragment in the text fragment database.

2. A method according to claim 1, wherein the locating step comprises:
    translating the source text fragment into the target language;
    comparing the source text fragment to target text fragments from the sentence in the target language; and
    identifying the target text fragment that matches the source text fragment.

3. A method according to claim 2, wherein the translating step uses an electronic dictionary to translate the source text fragment into the target language.

4. A method according to claim 1, further comprising:
    a second locating step for automatically locating a next source text fragment adjacent to the source text fragment without requiring that the next source text fragment has been previously stored in the text fragment database;
    a third locating step for automatically locating a next target text fragment that corresponds to the next source text fragment without requiring that the next target text fragment has been previously stored in the text fragment database; and
    a third storing step for storing, in the text fragment database, the source text fragment and the next source text fragment together with the target text fragment and the next target text fragment.

5. A method according to claim 4, further comprising:
    automatically combining the source text fragment and the next source text fragment to create a combined text fragment; and
    repeating the second locating step, the third locating step, and the third storing step while substituting the combined text fragment for the source text fragment.

6. A method according to claim 1, further comprising:
    a second locating step for locating a next source text fragment;
    a third locating step for locating a next target text fragment that corresponds to the next source text fragment;
    a third storing step for storing, in the text fragment database, the source text fragment and the next source text fragment together with the target text fragment and the next target text fragment, wherein the third storing step stores the source text fragment and the next source text fragment according to a predetermined syntactic pattern for the source language, and the target text fragment and the next target text fragment according to a predetermined syntactic pattern for the target language.

7. A method according to claim 1, wherein the second storing step stores grammatical information together with each of the source text fragment and the target text fragment.

8. A method according to claim 1, wherein the second storing step stores a root form of at least one of the source text fragment and the target text fragment together with at least one of the source text fragment and the target text fragment, respectively.

9. A method of translating text from a source language into a target language using a database which stores text fragments in the source language together with corresponding text fragments in the target language, the method comprising the steps of:
    building a text fragment database according to the method of claim 1;
    inputting text in the source language;
    extracting a text fragment from the input text;
    locating the extracted text fragment in the database;
    retrieving, from the database, a text fragment in the target language that corresponds to the extracted text fragment; and
    outputting the retrieved text fragment.

10. A method according to claim 9, wherein, in a case that the extracted text fragment cannot be located in the database, the method further comprises the steps of:
  translating the text fragment from the source language into the target language; and
  storing the translated text fragment in the database.

11. A method according to claim 10, wherein the translating step is performed manually by a human translator.

12. A method according to claim 9, wherein the database also stores grammatical data corresponding to the text fragments in the source language and the text fragments in the target language;
  wherein the method further comprises, between the extracting and locating steps, the step of determining grammatical data associated with the extracted text fragment; and
  wherein the locating step comprises searching through the database for text fragments in the source language that have grammatical data corresponding to the grammatical data associated with the extracted text fragment.

13. A method according to claim 12, wherein the grammatical data comprises a part-of-speech.

14. Computer-executable process steps stored on a computer-readable medium, the computer-executable process steps to build a text fragment database for use in translating fragments of text from a source language into a target language, the computer-executable process steps comprising:
  first storing code to store a sentence database in memory, the sentence database comprising a plurality of sentence pairs, each sentence pair including a sentence in the source language and a corresponding sentence in the target language;
  code to automatically.locate corresponding source and target text fragments in corresponding source and target language sentences, respectively, without requiring that the source text fragment or the target text fragment have been previously stored in the text fragment database; and
  second storing code to store the source text fragment together with the target text fragment in the text fragment database.

15. Computer-executable process steps according to claim 14, wherein the locating code comprises:
  code to translate the source text fragment into the target language;
  code to compare the source text fragment to target text fragments from the sentence in the target language; and
  code to identify the target text fragment that matches the source text fragment.

16. Computer-executable process steps according to claim 15, wherein the translating code uses an electronic dictionary to translate the source text fragment into the target language.

17. Computer-executable process steps according to claim 14, further comprising:
  second locating code to automatically locate a next source text fragment adjacent to the source text fragment without requiring that the source text fragment or the target text fragment have been previously stored in the text fragment database;
  third locating code to automatically locate a next target text fragment that corresponds to the next source text fragment and that is adjacent to the target text fragment without requiring that the source text fragment or the target text fragment have been previously stored in the text fragment database; and
  third storing code to store, in the text fragment database, the source text fragment and the next source text fragment together with the target text fragment and the next target text fragment.

18. Computer-executable process steps according to claim 17, further comprising:
  code to automatically combine the source text fragment and the next source text fragment to create a combined text fragment; and
  code to re-execute the second locating code, the third locating code, and the third storing code while substituting the combined text fragment for the source text fragment.

19. Computer-executable process steps according to claim 14, further comprising computer-executable process steps stored on a computer-readable medium, the computer-executable process steps comprising:
  a second locating step for locating a next source text fragment;
  a third locating step for locating a next target text fragment that corresponds to the next source text fragment;
  a third storing step for storing, in the text fragment database, the source text fragment and the next source text fragment together with the target text fragment and the next target text fragment, wherein the third storing code stores the source text fragment and the next source text fragment according to a predetermined syntactic pattern for the source language, and the target text fragment and the next target text fragment according to a predetermined syntactic pattern for the target language.

20. Computer-executable process steps according to claim 14, wherein the second storing code stores grammatical information together with each of the source text fragment and the target text fragment.

21. Computer-executable process steps according to claim 14, wherein the second storing code stores a root form of at least one of the source text fragment and the target text fragment together with at least one of the source text fragment and the target text fragment, respectively.

22. Computer-executable process steps stored on a computer-readable medium, the computer-executable process steps to translate text from a source language into a target language using a database which stores text fragments in the source language together with corresponding text fragments in the target language, the computer-executable process steps comprising:
  code to build a text fragment database according to the method of claim 14;
  code to input text in the source language;
  code to extract a text fragment from the input text;
  code to locate the extracted text fragment in the database;
  code to retrieve, from the database, a text fragment in the target language that corresponds to the extracted text fragment; and
  code to output the retrieved text fragment.

23. Computer-executable process steps according to claim 22, further comprising:
  code to receive a translated text fragment in the target language in a case that the extracted text fragment cannot be located in the database; and
  code to store the translated text fragment in the database.

24. Computer-executable process steps according to claim 23, wherein the receiving code receives the translated text fragment from a human translator.

25. Computer-executable process steps according to claim 22, wherein the database also stores grammatical data corresponding to the text fragments in the source language and the text fragments in the target language;
  wherein the computer-executable process steps further comprise code to determine grammatical data associated with the extracted text fragment; and wherein the locating code comprises code to search through the database for text fragments in the source language that have grammatical data corresponding to the grammatical data associated with the extracted text fragment.

26. Computer-executable process steps according to claim 25, wherein the grammatical data comprises a part-of-speech.

27. An apparatus for building a text fragment database for use in translating fragments of text from a source language into a target language, the apparatus comprising:

a memory which stores computer-executable process steps; and a processor which executes the process step so as (i) to store a sentence database in memory, the sentence database comprising a plurality of sentence pairs, each sentence pair including a sentence in the source language and a corresponding sentence in the target language, (ii) to automatically locate corresponding source and target text fragments in corresponding source and target language sentences, respectively, without requiring that the source text fragment or the target text fragment have been previously stored in the text fragment database, and (iii) to store the source text fragment together with the target text fragment in the text fragment database.

28. An apparatus according to claim 27, wherein the locating step comprises:

translating the source text fragment into the target language;

comparing the source text fragment to target text fragments from the sentence in the target language; and identifying the target text fragment that matches the source text fragment.

29. An apparatus according to claim 28, wherein the translating step uses an electronic dictionary to translate the source text fragment into the target language.

30. An apparatus according to claim 27, wherein the processor further executes additional process steps (i) to automatically locate a next source text fragment adjacent to the source text fragment without requiring that the source text fragment or the target text fragment have been previously stored in the text fragment database, (ii) to automatically locate a next target text fragment that corresponds to the next source text fragment and that is adjacent to the target text fragment without requiring that the source text fragment or the target text fragment have been previously stored in the text fragment database, and (iii) to store, in the text fragment database, the source text fragment and the next source text fragment together with the target text fragment and the next target text fragment.

31. An apparatus according to claim 30, wherein the processor executes process steps (i) to automatically combine the source text fragment and the next source text fragment to create a combined text fragment, and (ii) to re-execute the additional process steps to repeat the locating, locating and storing steps while substituting the combined text fragment for the source text fragment.

32. An apparatus according to claim 27, wherein the processor further executes process steps comprising:

a second locating step for locating a next source text fragment;

a third locating step for locating a next target text fragment that corresponds to the next source text fragment;

a third storing step for storing, in the text fragment database, the source text fragment and the next source text fragment together with the target text fragment and the next target text fragment; and wherein the processor stores the source text fragment and the next source text fragment according to a predetermined syntactic pattern for the source language, and the target text fragment and the next target text fragment according to a predetermined syntactic pattern for the target language.

33. An apparatus according to claim 27, wherein the processor stores grammatical information together with each of the source text fragment and the target text fragment.

34. An apparatus according to claim 27, wherein the processor stores a root form of at least one of the source text fragment and the target text fragment together with at least one of the source text fragment and the target text fragment, respectively.

35. An apparatus for translating text from a source language into a target language by building and using a database which stores text fragments in the source language together with corresponding text fragments in the target language, the apparatus comprising:

a memory which stores computer-executable process steps; and a processor which executes the process steps so as
(i) to store a sentence database in memory, the sentence database comprising a plurality of sentence pairs, each sentence pair including a sentence in the source language and a corresponding sentence in the target language,
(ii) to automatically locate corresponding source and target text fragments in corresponding source and target language sentences, respectively, without requiring that the source text fragment or the target text fragment have been previously stored in the text fragment database,
(iii) to store the source text fragment together with the target text fragment in the text fragment database,
(iv) to input text in the source language,
(v) to extract a text fragment from the input text,
(vi) to locate the extracted text fragment in the text fragment database,
(vii) to retrieve, from the text fragment database, a text fragment in the target language that corresponds to the extracted text fragment, and
(viii) to output the retrieved text fragment.

36. An apparatus according to claim 35, wherein, in a case that the extracted text fragment cannot be located in the text fragment database, the processor executes process steps (i) to receive a translation of the text fragment from the source language into the target language, and (ii) to store the translated text fragment in the text fragment database.

37. An apparatus according to claim 36, wherein the translation is received from a human translator.

38. An apparatus according to claim 35, wherein the text fragment database also stores grammatical data corresponding to the text fragments in the source language and the text fragments in the target language;

wherein the processor executes, between the extracting and locating steps, the step of determining grammatical data associated with the extracted text fragment; and wherein the locating step comprises searching through the text fragment database for text fragments in the source language that have grammatical data corresponding to the grammatical data associated with the extracted text fragment.

39. An apparatus according to claim 38, wherein the grammatical data comprises a part-of-speech.

* * * * *